(12) United States Patent
Jenkins

(10) Patent No.: US 11,886,495 B2
(45) Date of Patent: *Jan. 30, 2024

(54) PREDICTIVELY PRESENTING SEARCH CAPABILITIES

(71) Applicant: Google LLC, Mountain View, CA (US)

(72) Inventor: Thomas Jenkins, London (GB)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/380,516

(22) Filed: Jul. 20, 2021

(65) Prior Publication Data

US 2021/0349936 A1 Nov. 11, 2021

Related U.S. Application Data

(63) Continuation of application No. 15/222,024, filed on Jul. 28, 2016, now Pat. No. 11,080,328, which is a
(Continued)

(51) Int. Cl.
*G06F 16/58* (2019.01)
*G06F 16/29* (2019.01)
(Continued)

(52) U.S. Cl.
CPC ........ *G06F 16/5866* (2019.01); *G06F 3/0484* (2013.01); *G06F 16/24575* (2019.01);
(Continued)

(58) Field of Classification Search
CPC ........... G06F 16/5866; G06F 16/24575; G06F 16/9537; G06F 16/252; G06F 16/29;
(Continued)

(56) References Cited

U.S. PATENT DOCUMENTS 8,015,183 B2 * 9/2011 Frank ..................... G06F 16/38
702/179
8,077,915 B2 12/2011 Thorn
(Continued)

FOREIGN PATENT DOCUMENTS

CN 101437039 A 5/2009
CN 101535994 A 9/2009
(Continued)

OTHER PUBLICATIONS

EP Summons to Attend Oral Proceedings in European Application No. 13812330.2, dated Sep. 17, 2020, 10 pages.
(Continued)

*Primary Examiner* — Hosain T Alam
*Assistant Examiner* — Saba Ahmed
(74) *Attorney, Agent, or Firm* — Dority & Manning, P.A.

(57) ABSTRACT

Example techniques and systems may obtain one or more search types associated with a geographic location of a computing device. In one example, a technique may include determining, by a mobile computing device, a geographic location of the mobile computing device and obtaining one or more search types associated with the geographic location. Responsive to obtaining the one or more search types, the technique may also include outputting, by the mobile computing device and for display, a graphical user interface comprising at least an indication of the one or more search types associated with the geographic location.

19 Claims, 7 Drawing Sheets

Related U.S. Application Data continuation of application No. 13/901,540, filed on May 23, 2013, now abandoned.

(60) Provisional application No. 61/733,873, filed on Dec. 5, 2012.

(51) Int. Cl.

| | |
|---|---|
| *G06F 16/25* | (2019.01) |
| *G06F 16/9537* | (2019.01) |
| *G06F 16/2457* | (2019.01) |
| *G06F 3/0484* | (2022.01) |
| *G06F 21/62* | (2013.01) |
| *G06N 5/022* | (2023.01) |
| *H04W 4/02* | (2018.01) |

(52) U.S. Cl.
CPC ............ *G06F 16/252* (2019.01); *G06F 16/29* (2019.01); *G06F 16/9537* (2019.01); *G06F 21/6263* (2013.01); *G06N 5/022* (2013.01); *H04W 4/023* (2013.01)

(58) Field of Classification Search
CPC ... G06F 3/0484; G06F 21/6263; G06N 5/022; H04W 4/023
USPC ........................................................ 707/706
See application file for complete search history.

(56) References Cited

U.S. PATENT DOCUMENTS

| | | | |
|---|---|---|---|
| 8,260,775 | B2 | 9/2012 | Ahn et al. |
| 8,660,541 | B1 | 2/2014 | Beresniewicz et al. |
| 8,812,029 | B1 | 8/2014 | Cao et al. |
| 8,893,010 | B1* | 11/2014 | Brin .................. G06Q 30/0635 715/738 |
| 9,363,634 | B1 | 6/2016 | Kirmse et al. |
| 2003/0095681 | A1 | 5/2003 | Burg et al. |
| 2004/0006425 | A1 | 1/2004 | Wood et al. |
| 2004/0128215 | A1* | 7/2004 | Florance .............. G06Q 10/087 705/28 |
| 2006/0089792 | A1* | 4/2006 | Manber .................. H04L 67/04 707/E17.11 |
| 2007/0203897 | A1 | 8/2007 | Ueno et al. |
| 2009/0132316 | A1* | 5/2009 | Florance ................ G06Q 30/06 715/810 |
| 2009/0171559 | A1* | 7/2009 | Lehtiniemi ............ G01C 21/00 705/7.34 |
| 2009/0171570 | A1 | 7/2009 | Chiba |
| 2009/0290812 | A1 | 11/2009 | Naaman et al. |
| 2009/0316951 | A1 | 12/2009 | Soderstrom |
| 2011/0184953 | A1 | 7/2011 | Joshi et al. |
| 2011/0282867 | A1 | 11/2011 | Palermiti, II et al. |
| 2012/0010955 | A1 | 1/2012 | Ramer et al. |
| 2012/0117051 | A1 | 5/2012 | Liu et al. |
| 2013/0041883 | A1 | 2/2013 | Bennett |
| 2014/0037218 | A1 | 2/2014 | Zweig et al. |
| 2014/0046935 | A1 | 2/2014 | Bengio et al. |
| 2014/0250120 | A1 | 9/2014 | Mei et al. |
| 2014/0359483 | A1* | 12/2014 | Forutanpour ........... H04L 67/10 715/753 |
| 2015/0078667 | A1 | 3/2015 | Yun et al. |
| 2015/0248732 | A1 | 9/2015 | Young |
| 2016/0085774 | A1 | 3/2016 | Bhamidipati et al. |
| 2016/0321278 | A1* | 11/2016 | Naqvi .................... G06Q 30/06 |

FOREIGN PATENT DOCUMENTS

| | | |
|---|---|---|
| CN | 102484769 A | 5/2012 |
| KR | 100785928 | 12/2007 |
| WO | WO2008/032200 | 3/2008 |

OTHER PUBLICATIONS

Google (online), "Using Location—Web Search Help", Retrieved from the Internet: <hllps ://support. goo gle. com/websearch/bin/answer. py?hl= en&answer=2 717 508&topic= 25 2 7 5&ctx=topic> First Accessed on: Dec. 5, 2012, 1 page.

Hunter T., "Vehicle navigation and fleet management using differential GPS," Vehicle Navigation and Information Systems Conference, Sep. 11, 1989, 1 page (Abstract Only).

International Preliminary Report on Patentability from International Application No. PCT/US2013/073361, dated Jun. 18, 2015, 8 pages.

International Search Report and Written Opinion of International application No. PCT/US2013/073361, dated Aug. 28, 2014, 12 pages.

Office Action issued in Chinese Application No. 201380071568.6, dated Jan. 2, 2018, 16 pages (with English Translation).

Office Action issued in Indian Application No. 3278/CHENP/2015PCT, dated Dec. 4, 2019, 7 pages.

Okabe et al., "A Car Navigation System Utilizing a GPS Receiver," Proceedings of the International Conference on Consumer Electronics, Jun. 8, 1993, 2 pages.

Yamaguchi, "Honda in-car navigation system for the U.S.," Automotive Engineering, Society of Automotive Engineers. Jun. 1, 1996, 3 pages.

* cited by examiner

PREDICTIVELY PRESENTING SEARCH CAPABILITIES

CROSS REFERENCE TO RELATED APPLICATIONS

This application is a continuation of U.S. application Ser. No. 15/222,024, filed on Jul. 28, 2016, which is a continuation of U.S. application Ser. No. 13/901,540, filed on May 23, 2013, which claims the benefit of U.S. Provisional Application No. 61/733,873, filed Dec. 5, 2012, the entire contents of each are incorporated herein by reference.

BACKGROUND

Current image-based visual search technology tends to work well when provided certain classes of image input (e.g., a barcode) but poorly when provided others (e.g., a sweater). As such, failing to properly identify an optimal search tool or technology for a given user context can lead to imprecise or inapplicable search results.

SUMMARY

In one example, a method includes determining, by a mobile computing device, a geographic location of the mobile computing device, obtaining one or more search types associated with the geographic location, and responsive to obtaining the one or more search types, outputting, by the mobile computing device and for display, a graphical user interface comprising at least an indication of the one or more search types associated with the geographic location.

In another example, a computing device includes one or more processors, a device location module operable by the one or more processors to determine a geographic location of the mobile computing device, and a predictive module operable by the one or more processors to obtain one or more search types associated with the geographic location, and responsive to obtaining the one or more search types, output, for display, a graphical user interface comprising at least an indication of the one or more search types associated with the geographic location.

In an additional example, a computer-readable storage medium comprising instructions that, when executed, configure one or more processors of a computing device to determine a geographic location at which the computing device is located, obtain one or more search types associated with the geographic location, and responsive to obtaining the search type, output, for display, an indication of the one or more search types associated with the geographic location.

In an additional example, a system includes means for determining a geographic location of a mobile computing device, means for obtaining one or more search types associated with the geographic location, and means for, responsive to obtaining the one or more search types, outputting, for display, a graphical user interface comprising at least an indication of the one or more search types associated with the geographic location.

The details of one or more examples are set forth in the accompanying drawings and the description below. Other features, objects, and advantages of the disclosure will be apparent from the description and drawings, and from the claims.

DETAILED DESCRIPTION

Figure 1:
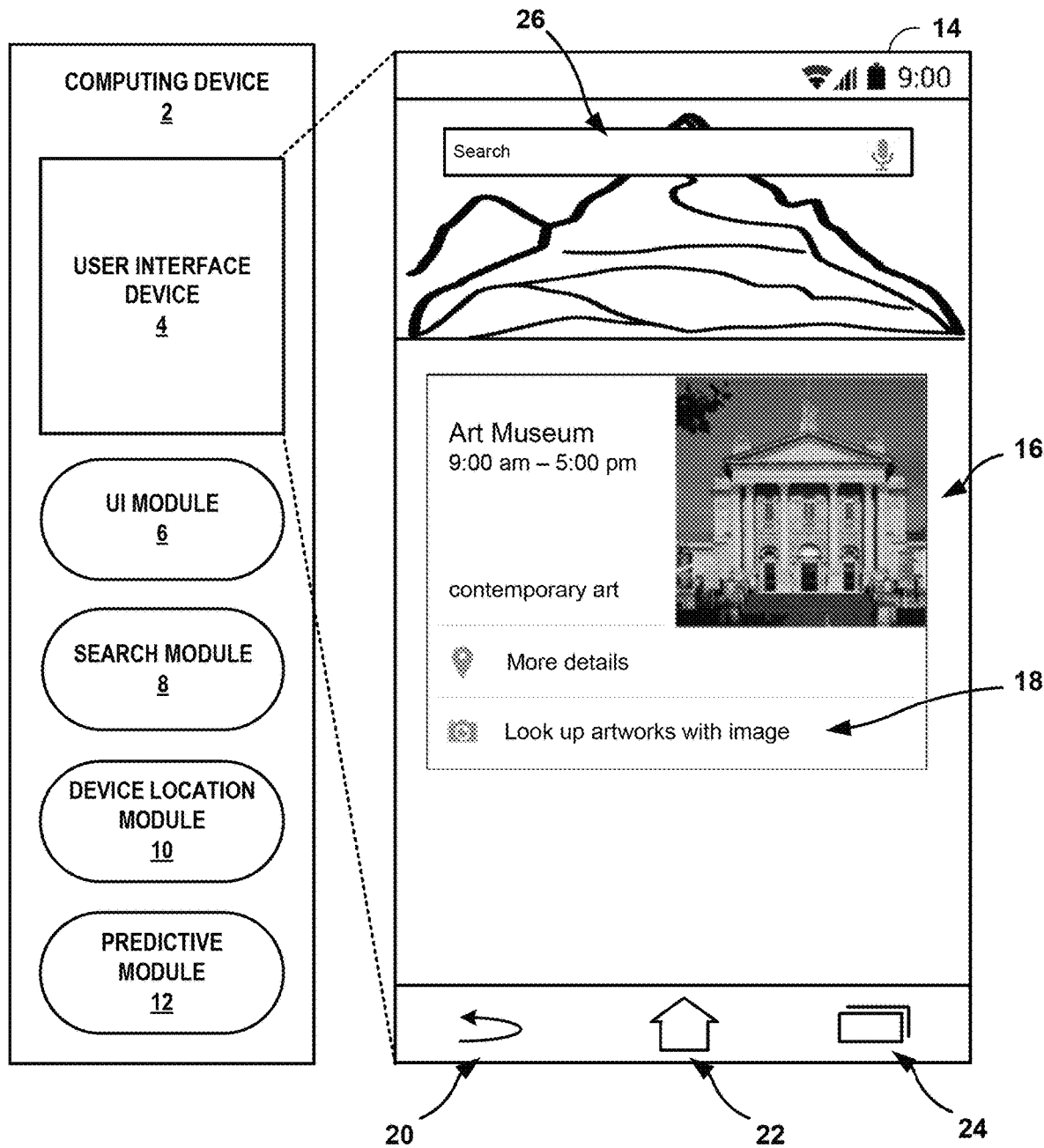
FIG. 1 is a conceptual diagram illustrating an example computing device that is configured to predictively present selective search capabilities, in accordance with one or more aspects of the present disclosure.

The present disclosure describes technology for predictively providing search results associated with a geographic location of a computing device.

In some locations, certain search capabilities are especially relevant. For example, a user in an art museum may want to recognize artwork using an image-based visual search. Similarly, a user in a shop may wish to use a computing device to perform an image-based visual search to recognize products and/or barcodes for comparison shopping or research. In some implementations of the disclosed technology, a computing device may use a current geographic location of the computing device to provide specific search capability suggestions to the user. The computing device may thus provide search capability suggestions to the user even when the user may not even know that the computing device is configured to provide such search capabilities such as image-based visual searches.

Using a predictive user interface system, a computing device can provide a graphical user interface that indicates a capability of the computing device, and/or an associated networked server, to perform relevant searches responsive to predictions relating to the type of searches available to the computing device and the user of the computing device. The computing device (e.g., a mobile computing device such as a mobile phone, smartphone, tablet computer, smartwatch, or notebook computer) may determine the geographic location at which the computing device is located using one or more sensors and/or location specific data available to the computing device. In one example, the computing device may transmit the geographic location to a networked device (e.g., a networked server) via a network. The networked device may determine one or more search types associated with the geographic location of the computing device and transmit the search types back to the computing device. Alternatively, the computing device may determine the one or more search types associated with the geographic location. In this manner the computing device and/or a networked server may include a predictive module configured to determine the one or more search types associated with the geographic location of the computing device.

In response to obtaining the determined search types associated with the geographic location, the computing device may output an indication of the one or more search types for display. For example, the computing device may output the indication of the search types for display at a display device. Example search types may include a visual search such as a barcode scanning capability, a quick response code scanning capability, an image recognizer capability, or an optical character recognition capability. In response to receiving user input selecting one of the search types, the computing device may obtain a search input (e.g., an image obtained by an optical sensor of the computing device for a selected visual search type) and transmit the search input to a networked device via a network. The computing device may then receive one or more search results from the networked device and output the search results for display.

In addition or alternatively to obtaining a search type associated with a geographic location at which a computing device is located, the search type may be based on other information. For example, the search type may be based on a time, such as a current time of day, a day of the week, a month of the year, or even a season of the year. In another example, the search type may be based on a calendar event associated with the computing device. The predictive user interface of the system may thus be configured to obtain search types specific to different criteria or combinations of different criteria. The different criteria may be indicative of the specific context for which the predictive user interface may determine a search type. In one example, a predictive module of the computing device may determine a search type associated with the geographic location of the computing device and a calendar event occurring at the same time at which the geographic location was determined. The computing device and/or a networked server may thus be configured to identify when a particular search type may be appropriate for a given geographic location.

One or more aspects of the disclosure may be operable only when the user has explicitly enabled such functionality. For example, computing device 2 may only obtain and/or transmit geographic locations of computing device 2 to a networked device in the instance where the user has explicitly consented to the use of such data. In addition, obtained images may only be transmitted to a networked device and/or used to generate search results after the user has consented to such use of this data. In this manner, the user may control any and all of data collection and data transmission as described herein. The user may consent or revoke consent to the collection and/or transmission of any data at any time. Furthermore, various aspects of the disclosure may be disabled by the user.

FIG. 1 is a conceptual diagram illustrating an example computing device 2 that is configured to predictively present selective search capabilities, in accordance with one or more aspects of the present disclosure. In the example of FIG. 1, computing device 2 is described as a mobile phone. However, in other examples, computing device 2 may be a personal digital assistant (PDA), a desktop computer, a laptop computer, a tablet computer, a portable gaming device, a portable media player, a camera, an e-book reader, a watch, or another type of computing device.

As shown in FIG. 1, computing device 2 may include user interface device (UID) 4, user interface (UI) module 6, search module 8, device location module 10, and predictive module 12. UI module 6, search module 8, device location module 10, and predictive module 12 may perform operations described herein using software, hardware, or a combination of both hardware and software residing in and executing on computing device 2. Computing device 2 may execute modules 6, 8, 10, and 12 with one or more processors in some examples. In other examples, computing device 2 may execute modules 6, 8, 10, and 12 as a virtual machine executing on underlying hardware of at least computing device 2.

UID 4 of computing device 2 may function as an input device and/or an output device for computing device 2. For example, UID 4 of computing device 2 may include a presence-sensitive input device, such as a touchscreen configured to receive tactile user input from a user of computing device 2. In some examples, the presence-sensitive input device may be or include a presence-sensitive display that also outputs a display for viewing by a user. UID 4 may receive tactile user input as one or more taps and/or gestures. UID 4 may detect taps or other gestures in response to the user touching or pointing to one or more locations of UID 4 with a finger or a stylus pen. UID 4 may be implemented using various technologies. For example, UID 4 may be implemented using a resistive touchscreen, a surface acoustic wave touchscreen, a capacitive touchscreen, a projective capacitance touchscreen, a pressure sensitive screen, an acoustic pulse recognition touchscreen, or another presence-sensitive display technology.

UID 4 may include any one or more of a liquid crystal display (LCD) dot matrix display, light emitting diode (LED) display, organic light-emitting diode (OLED) display, e-ink, or similar monochrome or color display capable of outputting visible information to the user of computing device 2. UID 4 may present a user interface (e.g., user interface 14), which may be related to functionality provided by computing device 2. For example, UID 4 may present various functions and applications such as an electronic message application, a camera application, a calendar application, a map application, and an Internet browser for accessing and downloading information from the Internet or any network. In another example, UID 4 may present a menu of options related to the function and operation of computing device 2, such as screen brightness and other configurable settings of computing device 2.

Computing device 2 may be configured to output to UID 4 one or more graphical user interfaces (GUIs) for display at UID 4. A GUI may include graphical elements displayed at various locations of UID 4. For example, FIG. 1 illustrates a predictive information GUI 14 that includes predictive card 16 as an example graphical element that may be included as part of predictive information GUI 14. Predictive information GUI 14 is a GUI that predictive module 12 can output for display at UID 4. Predictive module 12 can also output at least some predictive information at predictive information GUI 14. Predictive card 16 may include information predicted by predictive module 12, and/or or a module of a networked server or other device, to be useful, relevant, or otherwise interesting to a user of computing device 2. Predictive card 16, as shown in the example of FIG. 1, may include information about an object, which can include a brief textual summary of the object. In addition, predictive card 16 may include an icon or picture representing the object. Although determined search types may be presented within predictive card 16, computing device 2 may output for display and/or present an indication of one or more search types associated with a determined location of computing device 2 via other user interfaces.

As generally described herein, computing device 2 and/or a computing device reachable by computing device 2 (e.g., a networked sever, a cloud computing system, etc.) may determine a search type associated with a geographic location at which computing device 2 is located. In this manner, a display associated with computing device 2 may display an indication of the determined search type. In response to receiving selection of the determined search type and a search input for the search type, computing device 2 may obtain one or more search results associated with the search input. In the example of a visual search type, computing device 2 may obtain search results associated with an image of object obtained by a camera (e.g., an image sensor of computing device 2). Determining search types associated with one or more criteria, such as the geographic location of computing device 2, may enable computing device 2 to provide search types that may be appropriate for a user of computing device 2.

In one example, computing device 2 may be configured to determine a geographic location of computing device 2. Computing device 2 may also obtain one or more search types associated with the geographic location at which computing device 2 is located. Responsive to obtaining the one or more search types, computing device 2 may be configured to output a graphical user interface for display (e.g., predictive information GUI 14). Predictive information GUI 14 may include at least one indication of the one or more search types (e.g., search type indication 18) associated with the geographic location. UI device 4 may be configured to receive a selection of a search type or some other user input to obtain search results using the selected search type presented by predictive information GUI 14.

In some examples, device location module 10 may be configured to determine the geographic location of computing device 2. The geographic location may be indicative of where computing device 2 is located. The geographic location may be represented by a variety of different data. Latitude and longitude coordinates may represent the geographic location. Alternatively, the geographic location may be represented by a state, city, neighborhood, building, or other indication of the location of computing device 2. For example, computing device 2 may include a global positioning system (GPS) radio configured to receive GPS signals (e.g., from a GPS satellite). Device location module 10 may analyze the GPS signals received by the GPS radio to determine the current geographic location of computing device 2. Computing device 2 may likewise include a cellular radio configured to receive cellular radio signals. In addition, or alternative, to the GPS signals, device location module 10 may analyze the cellular radio signals received by the cellular radio to determine a geographic location of computing device 2. In other examples, device location module 10 may analyze WiFi signals or other networking signals associated with a network access point of a known location to estimate the geographic location of computing device 2. In this manner, device location module 10 may obtain one or more data points to determine a geographic location of computing device 2. Computing device 2 may include any number of radios or sensor devices that receive signals that include data with which device location module 10 may analyze to determine the geographic location of computing device 2. Device location module 10 may use any combination of signals or data to determine the geographic location of computing device 2.

In some examples, the resolution or accuracy of the determined geographic location of computing device 2 may affect the ability of computing device 2 to obtain appropriate search types associated with the actual location of computing device 2. In other words, low resolution determination of a geographic location may not provide an accurate indication of where computing device 2 is located. Since an inaccurate indication of the geographic location may result in obtaining search types not associated with the actual location of computing device 2, computing device 2 may be configured to withhold obtaining or outputting for display a search type when the resolution of the geographic location is below a predetermined threshold. Withholding a search type may include not outputting the search type or outputting an error message via predictive information GUI 14.

Device location module 10 may determine the geographic location of computing device 2 at periodic intervals, in response to a request from a software application, or dynamically based on various inputs. For example, device location module 10 may update the geographic location of computing device 2 at predetermined intervals (e.g., once every second, once every minute, etc.). In another example, device location module 10 may determine the geographic location in response to receiving a request from a software module or networked device. For example, predictive module 12 may request the current geographic location based on user actions or other inputs. In alternative examples, device location module 10 may determine the geographic location of computing device 2 in response to one or more inputs exceeding a respective threshold. For example, device location module 10 may update the geographic location in response to output from an accelerometer and/or gyroscope exceeding a threshold that indicates movement of computing device 2.

In some examples, predictive module 12 may generate predictive card 16 (or another feature of predictive information GUI 14) based on the geographic location of computing device 10. Predictive card 16 may include search type indication 18, which is an indication of the determined search type based on the geographic location of computing device 2. As shown in FIG. 1, search type indication 18 is representative of a visual search type. However, one or more search type indications 18 may be provided in predictive card 16, and each search type indication may be indicative of different search type capabilities performable by computing device 2. In other examples, search type indications 18 may be provided by predictive information GUI 14 in a format different than predictive card 16 (e.g., a notification, a separate window relating to available search types, a portion of an application user interface, etc.). One or more devices may determine the one or more search types associated with a current location of computing device 2.

In one example, computing device 2 may be configured to obtain one or more search types by determining the one or more search types associated with a geographic location. Computing device 2 may store or obtain a set of locations, where each location is associated with one or more search types. This set of locations may be referred to as whitelisted locations and may be updated periodically or in response to a request from predictive module 12. In some examples, predictive module 12 may be configured to determine that computing device 2 is physically located proximate to a whitelisted location based on the determined geographic location of computing device 2. In other examples, device location module 10 may determine the proximity of the determined geographic location to a whitelisted location. Computing device 2 may be configured with a list of locations at which certain search types may be especially relevant (e.g., a location whitelist). Alternatively, the list of whitelisted locations may be stored and accessed by a networked server in communication with computing device 2. That is, a whitelisted location may be a location for which visual searching capabilities or other searching capabilities are relevant. In other words, one or more various types of searches may be associated with particular geographic locations.

A type of search may be a visual search that utilizes one or more optical sensors to obtain one or more images. Examples of visual search capabilities include a barcode scanner, a quick response (QR) code scanner, an image recognizer, and optical character recognition. Other search capabilities may include audio and textual search capabilities. Each whitelisted location may be associated with one or more search types, such as a visual search, audio search, and/or text search. In addition, each whitelisted location may be associated with one or more capabilities or subtypes of the search type (e.g., a barcode scanner, a QR code scanner, an image recognizer, and optical character recognition or a visual search).

The whitelisted locations may correspond to particular GPS coordinates and may be associated with information about objects located at or near the location, including names, types, or other information about particular buildings, businesses, products, or other objects at or near the location. For example, the whitelisted location may be associated with a bookstore. Bookstores frequently include goods having bar codes, which may be well suited for visual searching. Thus, the location may be included within the whitelist and associated with the search type of a barcode scanner capability. In another example, the whitelisted location may be associated with restaurant. However, restaurants may not include objects (e.g., food) for which a visual search type is well suited or appropriate. In other words, a visual search may not elicit accurate search results. Thus, the location of the restaurant may not be included within the whitelist.

Computing device 2 may be configured to determine one or more search types associated with a geographic location by first comparing the geographic location to a set of predetermined geographic locations (e.g., whitelisted locations). Computing device 2 may then determine which search types are associated with the geographic location of computing device 2 by matching or otherwise correlating the geographic location to one or more of the whitelisted locations. If the geographic location matches or otherwise correlates with two or more whitelisted locations, predictive module 12 may provide each search type associated with all of the matching whitelisted locations.

In other examples, computing device 2 may be configured to determine that it is proximate to a whitelisted location in response to determining that computing device 2 is located at a geographic location within a threshold distance from the whitelisted location (e.g., within 100 meters, 3 blocks, 2 miles, etc.). Device location module 10 may determine the geographic location of computing device 2 and provide an updated geographic location to predictive module 12 periodically, at predetermined intervals, in response to a change in the geographic location, or responsive to a request from predictive module 12. Using the geographic location, predictive module 12 may determine that computing device 2 is or is not located proximate to (e.g., at or near, such as within a threshold distance) a whitelisted location. Alternatively, device location module 10 may be configured to determine that computing device 2 is or is not located proximate to a whitelisted location and provide predictive module 12 with location information (e.g., the geographic location) associated with the location of computing device 2. If device location module 10 determines that computing device 2 is not located at or near a whitelisted location, device location module 10 may provide predictive module 12 with an indication that computing device 2 is not located at or near a whitelisted location (e.g., predictive module 12 would not provide any search type indication 18).

Predictive module 12 may be configured to receive the location information (e.g., a determined geographic location) from device location module 10 and, based on the received information, determine whether to generate a predictive user interface that includes (e.g., indicates) visual search capabilities. If the received information includes an indication that computing device 2 is not at or near a whitelisted location, predictive module 12 may determine that a predictive user interface having specific search capabilities should not be generated and refrains from, or withholds, generating such a predictive user interface. For example, if predictive module 12 determines that the geographic location of computing device 2 is not at or near an art museum referenced in predictive card 16 of FIG. 1, predictive module 12 may refrain from generating predictive card 16 such that predictive card 16 is not included within predictive information GUI 14. In other examples, predictive module 12 may merely refrain from including a search type indication 18 when no search type is associated with the detected geographic location.

If the received location information indicates that computing device 2 is at or near a whitelisted location, predictive module 12 may generate a predictive card for inclusion in a predictive user interface (e.g., predictive information GUI 14). Predictive card 16 may include at least a portion of the location information, such as the determined geographic location or a representation of the geographic location, received from device location module 10. For example, predictive card 16 may include a building name, business name, or street address instead of a geographic location in the form of latitude and longitude coordinates. Predictive module 12 may then determine, based on the location information, what search type should be included within predictive card 16. An example of the included search type may be one or more visual search capabilities or indications of visual search capabilities of computing device 2 and/or an associated networked server provided within predictive card 16. For example, in response to determining that computing device 2 is located at or near an art museum (a whitelisted location), predictive module 12 may be configured to determine that a visual search type is associated with the art museum for searching artwork using images (e.g., images captured using a camera element or other optical sensor of computing device 2) is a relevant visual search capability. That is, visual searching for artwork using images is a visual search capabilities related to or associated with the geographic location of computing device 2. Predictive module 12 may include at least an indication of the visual search capability determined to be related to the location shown within predictive card 16 (e.g., a visual search of search type indication 18). Predictive module 12 may send at least an indication of the generated predictive card (e.g., predictive card 16) to UI module 6 for output by UID 4 within GUI 14.

The one or more search types applicable for the present circumstances of computing device 2 may not be limited to geographic location of computing device 2. For example, additional criteria may be used to determine which search types may generate appropriate search results. In one example, predictive module 12 may determine the one or more search types for predictive card 16 based on the geographic location of computing device 2 and a type of computing device 2. The type of computing device may be indicative of available sensors (e.g., optical sensors or microphones), quality of sensors, processing speed, available memory, operating system version, or any other software or hardware capabilities of computing device 2. For example, a visual search type may not be appropriate if computing device 2 does not include an optical sensor (e.g., a camera) or if the optical sensor is malfunctioning. In this manner, the type of computing device may also include a current operating state of one or more components.

In other examples, predictive module 12 may determine the one or more search types based on a current time. This current time may be the current time when predictive module 12 determines the one or more search types or the current time during which the geographic location was determined. In either case, predictive module 12 may use the current time to further specify when certain search types are appropriate to generate accurate search results. For example, a visual search type associated with landmarks of a whitelisted location may not be an effective search tool at night when images of the landmarks would not be well defined. In another example, a search type of a barcode scanning capability may only be appropriate for a business location when the business is open to customers. Therefore, predictive module 12 may use the current time to at least partially determine one or more search types associated with a geographic location.

Each whitelisted location may have a time range associated with each search type. In addition, or alternatively, predictive module 12 may use the current time and context of the search type, context of the location, or additional database to correlate search types and appropriate times at the determined geographic location. For example, if the geographic location is associated with a business, predictive module 12 may search for business hours and determine the search type based on if the business is open to customers. Predictive module 12 may also use the current time to identify daytime and nighttime, a day of the week, a month, a season, or even a year that may be applicable for determining appropriate search types.

The current time may also be used to correlate the search times with a scheduled event associated with computing device 12. Predictive module 12 may obtain information from a calendar or event schedule associated with computing device 2 (e.g., an account associated with a user of computing device 2). A scheduled event may be indicative of a search type of particular interest or applicability at the identified time that the geographical location of computing device 2 was determined. For example, a scheduled event may be indicative of a shopping trip, an art museum event, or any other event at which particular search types may be applicable. Predictive module 12 may select from one or more search types associated with the geographic location of computing device 2 based on the scheduled event. In this manner, predictive module 12 may identify which one of multiple search types associated with the same whitelisted location is applicable for the scheduled event. Alternatively, predictive module 12 may use the scheduled event to select between two or more whitelisted locations that correspond to the geographic location of computing device 2. For example, if an art museum and a bookstore are both identified within a threshold distance of the geographic location of computing device 2, predictive module 12 may select the search types associated with the art museum if a scheduled event at the current time is indicative of visiting the art museum.

As described herein, UI device 4 may be configured to display predictive card 16 and one or more search type indications 18 within the predictive card. In response to receiving a user selection of search type indication 18 presented within predictive card 16, search module 8 may execute a search based on the selected search type. Predictive information GUI 14 may also provide additional features. For example, GUI 14 may include search bar 26 that accepts text and/or voice search requests, regardless of any search type predicted by predictive module 12. GUI 14 may also include back icon 20, home icon 22, and recent applications icon 24. UI module 6 may output the previous screen or application in response to receiving selection of back icon 20. UI module 6 may output the home screen in response to receiving selection of home icon 22. UI module 6 may also output a list of previously executed applications in response to receiving selection of recent applications icon 24.

Although computing device 2 may determine one or more search types associated with the geographical location of computing device 2, a networked sever (e.g., a networked device) may perform part or all of the determination of the one or more search types. For example, computing device 2 may be configured to obtain one or more search types by transmitting the determined geographic location of computing device 2 to a networked server over a network. The networked server may include a predictive module similar to predictive module 12 of computing device 2. Responsive to receiving the geographic location of computing device 2, the networked server may search one or more repositories for search types associated with the geographic location. In response to determining the search types, the networked server may then transmit the search types back to computing device 2 such that computing device 2 receives the search types associated with the determined geographic location.

Utilizing a networked server to determine search types associated with the geographic location of computing device 2 may enable computing device 2 to offload processing requirements to the networked server. In addition, the networked server may have access to recently updated databases of search types associated with each whitelisted location of the set of locations. In some examples, the networked server may be configured to determine the geographic location of computing device 2. Device location module 10 may obtain data related to the location of computing device 2 and transmit the data to the networked server. In addition, or alternatively, the networked server may obtain data from one or more cellular network towers or other access points to which computing device 2 is connected. The networked server may then determine the geographic location, transmit the geographic location back to computing device 2, and/or transmit one or more search types associated with the determined geographic location back to computing device 2.

Computing device 2 may output one or more determined search types for display and may receive an indication of user input selecting one of the search types. In response to selection of the search type, search module 8 may initiate a search based on the selected search type. For example, search module 8 may prompt the user to input one or more search terms corresponding to the selected search type. Search module 8 may then perform the search within a memory of computing device 2 and/or transmit the search terms to a networked server to obtain search results from the networked server. UI device 4 may output the obtained search results for display. For example, UI device 4 may output the search results within one or more predictive cards similar to, or including, predictive card 16. The search results may include one or more selectable links to provide additional information related to the search result.

For example, UI device 4 may receive user input selecting a visual search type presented within predictive card 16. Computing device 2 may obtain, by one or more optical sensors, one or more images for the visual search. In some examples, computing device 2 may obtain the images in response to receiving the user input selecting the visual search type. In other examples, computing device 2 may output a camera application in response to selection of the visual search type (e.g., search type indication 18). The camera application may be a standalone application or embedded within predictive card 18 and/or predictive information GUI 14. Computing device 2 may obtain images in response to user input requesting each respective image. In response to obtaining the images, computing device 2 may transmit the images to a networked server such that the networked server can generate one or more search results based on the search terms of the obtained images. Computing device 2 may then receive at least one search result from the networked server based on at least one of the transmitted images. Search module 8 may then output, for display by UI device 4, GUI 14 that includes an indication of the at least one search result.

In other examples, computing device 2 may be configured to output an indication of a recognized object within an image prior to a user requesting a search based on the object. In this manner, computing device 2 may indicate which visual objects may return search results. In response to UI device 4 receiving user input selecting a visual search type indication presented within predictive card 16, computing device 2 may begin obtaining images from one or more optical sensors. Responsive to obtaining the images, UI module 6 may output each of the respective obtained images for display at UI device 4. For example, UI module 6 may output the images within a window of predictive card 16 and/or GUI 14. The window may be described as a live window such that the images presented within the live window are presented in real-time or near-real time, approximately at the time the images are obtained by an optical sensor.

In response to obtaining the images, search module 8 may also transmit each of the respective images to a networked device (e.g., a networked server) for image recognition. The networked server may analyze each of the images for recognized objects. A recognized object may be an object for which search results may be obtained during a visual search. Although full resolution images may be transmitted to the networked server for object recognition, such transmissions may require high data bandwidth. In some examples, computing device 2 may generate a low resolution image for each of the obtained images and transmit the low resolution images for object recognition. In other examples, high or low resolution images may only be sent periodically for image recognition. Since most consecutive images may include similar objects, less than all of the images may be needed to adequately recognize objects within the images. For example, computing device 2 may transmit images once per second, once every five seconds, once every ten seconds, and so on. If images are captured at a rate higher than the predetermined image transmission frequency, computing device 2 may select images obtained at the transmission frequency for sending to the network server. Images not transmitted may be presented by UI device 4, discarded prior to or after presentation, or stored in a buffer for later use.

In response to recognizing an object within a received image, the networked server may transmit an indication of the recognized object (or recognized objects) within the image. In response to receiving the indication of one or more recognized objects from the networked server, UI module 4 may output GUI 14 for display that includes a prompt to initiate a search based on the recognized object. The prompt to initiate a search may include a selectable icon adjacent to the window presenting the obtained images. In some examples, computing device 2 may superimpose a red box around the recognized object within the image displayed by UI device 4, an arrow pointing to the recognized object, a textual description of the recognized object, or some other indication of the object recognized within the image or images. If multiple different objects are recognized within the same image, each object may be identified by a separate selectable prompt specific to each object. In this manner, computing device 2 may be configured to receive user input specifying the recognized object for which a search is to be conducted.

Once an object is recognized and the respective prompt is displayed at UI device 4, computing device 2 may be configured to receive selection of the prompt to initiate a search based on the recognized object associated with the prompt. Responsive to receiving the selection of the prompt, computing device 2 may be configured to transmit an indication of the prompt of the graphical user interface to initiate the search. The networked server may subsequently perform a search based on the image or object of the image associated with the search prompt. In this manner, the search term for the search may include one or more objects of an obtained image. Computing device 2 may receive, from the networked server, at least one search result based on one or more recognized objects associated with the selected search prompt. In response to receiving the search results, search module 8 may output the search results for display at UI device 4 within GUI 14. In some examples, GUI 14 may present the search results within predictive card 16 or another predictive card similar to predictive card 16. Computing device 2 may continue to obtain images to perform subsequent searches based on other obtained images and/or recognized objects within images. In alternative examples, the networked server may conduct a search automatically for any object recognized within an obtained image and transmit the search results to computing device 2 for display.

Although a networked server is generally described as generating search results, computing device 2 may alternatively, or additionally, provide search results for any selected search type. For example, search module 8 may be configured to search one or more memories of computing device 2 and/or repositories accessible to search module 8 via a network. In this manner, search module 8 may obtain search results that include items retrieved from a networked repository, networked server, and/or a memory of computing device 2. Computing device 2 may transmit search terms to a networked server to obtain search results for any selected search types. For example, audio files and/or text strings may also be used as search terms for their respective search types.

Search results described herein may be generated using one or more search engines. For example, search module 8 of computing device 2 and/or a search module executed by one or more networked servers may employ one or more algorithms for obtaining information relevant to a search term. In some examples, a search engine may be specific to the type of search predicted by predictive module 12, such as a visual search. The search engine may operate locally (e.g., at computing device 2 or the networked server) and/or over one or more networks.

In this manner, techniques of this disclosure may enable a computing device to expose specific search capabilities (e.g., visual search capabilities) in a much more targeted way and in a context where the capability is potentially much clearer than if the capability was presented with a generic indication (e.g., "Visual Search") and without regard for the location of the computing device 2. Techniques of this disclosure may also enable computing device 2 to promote visual search capabilities to users who would otherwise be unaware of the computing device's visual search capabilities.

Various aspects of the disclosure may be operable only when the user has explicitly enabled such functionality. For example, in the instance where the user has consented to the use of any data, e.g., geographic locations of computing device 2 or images obtained by an optical sensor of computing device 2, the data may be used to obtain search types and/or search results relevant to one or more objects within the images. The user may consent or revoke consent to the collection and/or transmission of any data at any time.

In addition, various aspects of the disclosure may be disabled by the user. Thus, a user may elect to prevent computing device 2 from collection and/or transmitting location information associated with computing device 2, obtained images, or any other information related to the location of where computing device 2 is located or where the user resides. In addition, the user may prevent computing device 2 from transmitting information identifiable of the user without confirmation. Computing device 2 may present one or more screens requesting that the user elect to transmit any or all information. In this manner, the user may control what information, if any, is transmitted to a networked server or other computing device. More generally, privacy controls may be applied to all aspects of the disclosure based on a user's privacy preferences to honor the user's privacy preferences related to the use of computing device 2 or any other computing device or functionality described in this disclosure.

Figure 2:
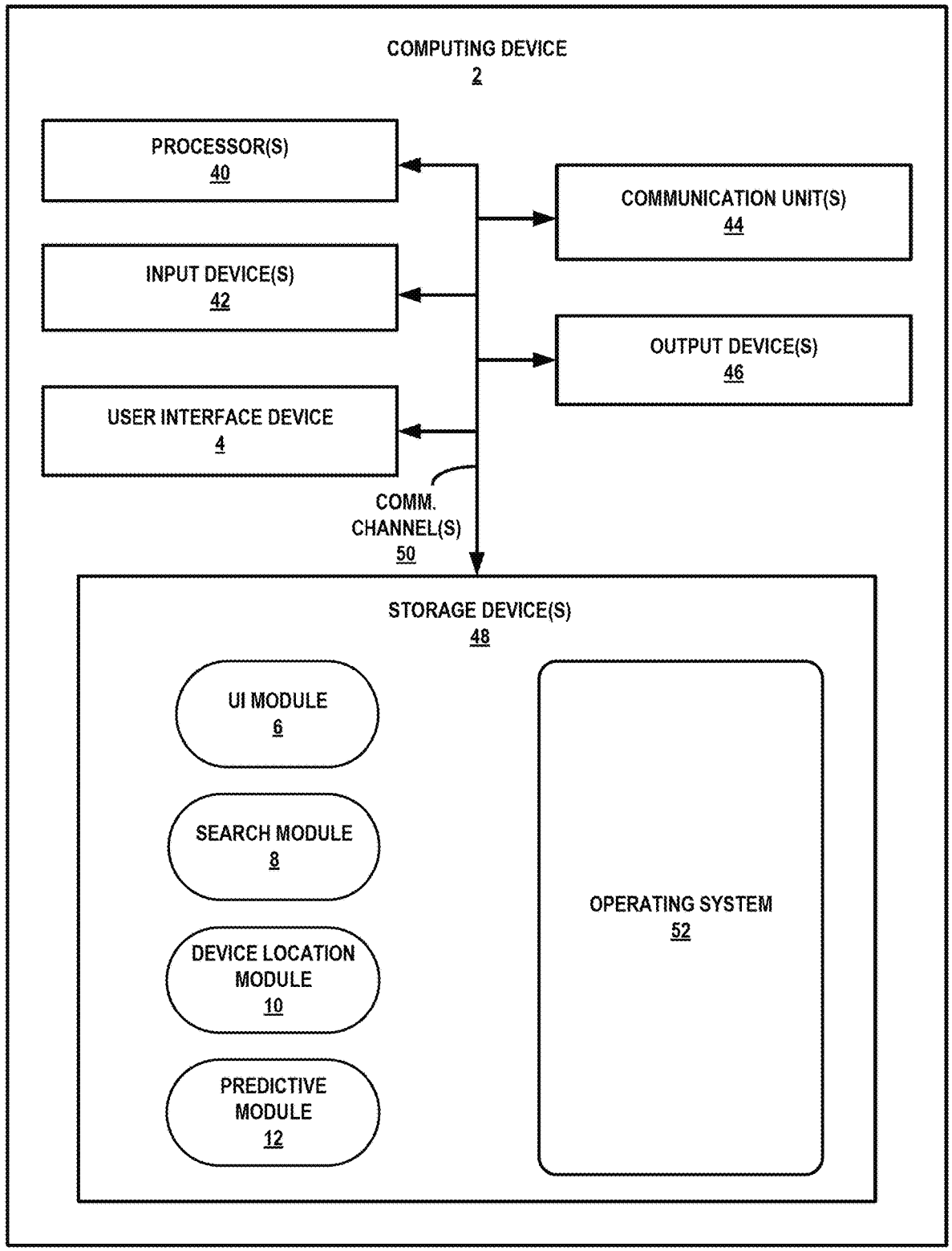
FIG. 2 is a block diagram of the example computing device of FIG. 1.

FIG. 2 is a block diagram illustrating an example computing device 2. Computing device 2 of FIG. 2 is described below within the context of FIG. 1. In other examples, computing device 2 can include fewer, additional, or different components compared to those illustrated in FIG. 2. For example, although user interface device 4 ("UID 4") is shown in FIG. 2 as being integral with computing device 2, in other implementations, UID 4 may be operably coupled to computing device 2, e.g., by a wired or wireless data connection. As shown in the example of FIG. 2, computing device 2 includes UID 4, one or more processors 40, one or more input devices 42, one or more communication units 44, one or more output devices 46, and one or more storage devices 48. In this example, storage devices 48 of computing device 2 also include UI module 6, search module 8, device location module 10, predictive module 12, and operating system 52. Communication channels 50 may interconnect each of the components 4, 6, 8, 10, 12, 40, 42, 44, 46, 48, and 52 for inter-component communications (physically, communicatively, and/or operatively). In some examples, communication channels 50 may include a system bus, a network connection, an inter-process communication data structure, or any other method for communicating data.

One or more input devices 42 of computing device 2 may receive input. Examples of input are tactile, audio, and video input. Input devices 42 of computing device 2, in one example, includes a presence-sensitive display, touch-sensitive screen, mouse, keyboard, voice responsive system, video camera, microphone or any other type of device for detecting input from a human or machine. A presence-sensitive display may include both a presence-sensitive input device and a display device. In addition, input devices 42 may include one or more optical sensors, such as a digital camera. The one or more optical sensors may obtain images for a visual search. A microphone may obtain audio information for an audio search.

One or more output devices 46 of computing device 2 may generate output. Examples of output are tactile, audio, and video output. Output devices 46 of computing device 2, in one example, includes a presence-sensitive display (which may include a display device), sound card, video graphics adapter card, speaker, cathode ray tube (CRT) monitor, liquid crystal display (LCD), or any other type of device for generating output to a human or machine.

One or more communication units 44 of computing device 2 may communicate with external devices (e.g., a networked server such as networked server 162 of FIG. 4) via one or more networks (e.g., network 160 of FIG. 4) by transmitting and/or receiving network signals on the one or more networks. For example, computing device 2 may use communication unit 44 to transmit and/or receive radio signals on a radio network such as a cellular radio network. Likewise, communication units 44 may transmit and/or receive satellite signals on a satellite network such as a GPS network. Examples of communication unit 44 include a network interface card (e.g. such as an Ethernet card), an optical transceiver, a radio frequency transceiver, a GPS receiver, or any other type of device that can send and/or receive information. Other examples of communication units 44 may include Bluetooth®, GPS, 3G, 4G, and Wi-Fi® radios found in mobile devices as well as Universal Serial Bus (USB) controllers.

UID 4 of FIG. 2 may include a presence-sensitive display. Computing device 2 may use the presence-sensitive display as an input device and an output device. For example, the presence-sensitive display of UID 4 may include a touchscreen (e.g., a presence-sensitive input device) configured to receive tactile user input from a user of computing device 2. The presence-sensitive display of UID 4 may also include a light emitting diode (LED) display (e.g., a display device) capable of outputting visible information to the user of computing device 2. UID 4 may present a user interface on the presence-sensitive display, such as predictive GUI 14 of FIG. 1, which may be related to functionality provided by computing device 2. For example, the presence-sensitive display of UID 4 may present various functions and applications, such as an electronic message client, a map application, an Internet browser for accessing and downloading information from the Internet, and a social media application. In another example, the presence-sensitive display of UID 4 may present a menu of options related to the function and operation of computing device 2, such as screen brightness and other configurable mobile phone settings.

In some examples, the presence-sensitive display may detect an object at and/or near the screen of the presence-sensitive display. As one non-limiting example range, a presence-sensitive display may detect an object, such as a finger or stylus, which is within 2 inches or less of the physical screen of the presence-sensitive display. The presence-sensitive display may determine a location (e.g., an (x,y) coordinate) of the presence-sensitive display at or near which the object was detected. In another non-limiting example range, a presence-sensitive display may detect an object 6 inches or less from the physical screen of the presence-sensitive display, and other exemplary ranges are also possible. The presence-sensitive display may determine the location selected by the object (e.g., user's finger) using capacitive, inductive, and/or optical recognition techniques. In some examples, the presence-sensitive display provides output using tactile, audio, or video stimuli as described with respect to output device 46.

One or more storage devices 48 within computing device 2 may store information required for use during operation of computing device 2. Storage devices 48, in some examples, have the primary purpose of being short term and not long-term computer-readable storage mediums. Storage devices 48 on computing device 2 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with UI module 6, search module 8, device location module 10, predictive module 12, and operating system 52.

One or more processors 40 may implement functionality and/or execute instructions within computing device 2. For example, processors 40 on computing device 2 may read and execute instructions stored by storage devices 48 that execute the functionality of UI module 6, search module 8, device location module 10, and predictive module 12. These instructions executed by processors 40 may cause computing device 2 to store information within storage devices 48 during program execution, such as notifications, notification objects, and/or information associated search module 8, device location module 10, and predictive module 12. Processors 40 may execute instructions of modules 6, 8, 10 and 12 to determine a geographic location of computing device 2, generate a predictive user interface (e.g., GUI 14), performing visual searches, etc. That is, modules 6, 8, 10 and 12 may be operable by processors 40 to perform various actions, including generating and outputting predictive user interfaces. In other examples, one or more processors 40 may execute instructions of any of modules 6, 8, 10 and 12 to request a networked server to perform (or at least partially perform) any of the functions attributed to modules 6, 8, 10 and 12 herein.

As described in FIG. 1, predictive module 12 may be configured to determine one or more search types associated with the geographic location of computing device 2. For example, predictive module 12 may compare the geographic location of computing device 2 to a set of geographic location. The geographic locations of the set of geographic locations may be associated with one or more search types. Therefore, predictive module 12 may determine, based on the comparison of the geographic location to the stored set of locations, the one or more search types associated with the geographic location at which computing device 2 is located. The set of geographic locations may be stored in storage devices 48 and/or predictive module 12 may obtain the set of geographic locations from a networked server or repository.

In some examples, predictive module 12 may determine one or more search types based on the geographic location of computing device 2 and one or more additional criteria. For example, predictive module 12 may obtain the type of computing device 2 from storage devices 48. The type of computing device may indicate available sensors, processors, memory, or any other capabilities. Predictive module 12 may then determine the search type that corresponds to both the geographic location of computing device 2 and the type of computing device.

In some examples, predictive module 12 may function to determine the search type associated with the geographic location at which computing device 2 is located. In other examples, a networked server or another networked device may determine one or more search types associated with the determined geographic location of computing device 2. For example, predictive module 12 may transmit the determined geographic location to a networked server (e.g., networked server 162 of FIG. 4) via communication unit 44. After the networked server determines the search type, communication unit 44 may receive the determined search type associated with the geographic location of computing device 2. Predictive module 12 may then output, for display by an output device 46, an indication of the determined search type.

Although the components of computing device 2 are illustrated in the example of FIG. 2 as within a common housing, one or more components may instead be wired or wirelessly tethered to computing device 2. For example, output device 26 (e.g., a display device) may be physically separate from computing device 2. In other examples, an optical sensor may not reside within a housing of computing device 2.

Figure 3:
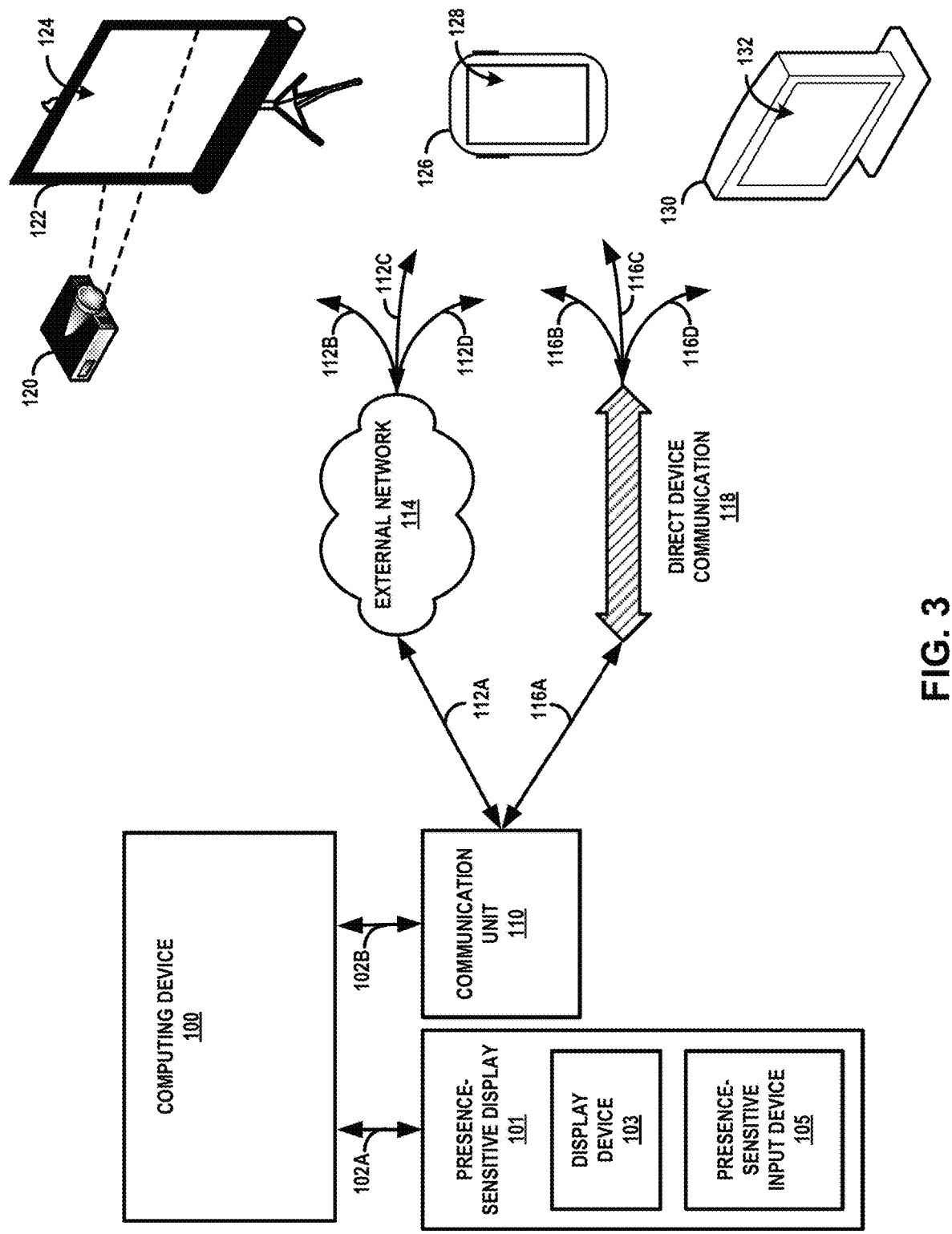
FIG. 3 is a block diagram illustrating an example computing device that outputs graphical content for display at a remote device.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 3 includes a computing device 100 (e.g., an example of computing device 2 of FIGS. 1 and 2), presence-sensitive display 101, communication unit 110, projector 120, projector screen 122, tablet device 126, and visual display device 130. Although shown for purposes of example in FIGS. 1 and 2 as a stand-alone computing device 2, a computing device may, generally, be any component or system that includes a processor or other suitable computing environment for executing software instructions and, for example, need not include a presence-sensitive display.

As shown in the example of FIG. 3, computing device 100 may be a processor that includes functionality as described with respect to processor 40 in FIG. 2. In such examples, computing device 100 may be operatively coupled to presence-sensitive display 101 by a communication channel 102A, which may be a system bus or other suitable connection. Computing device 100 may also be operatively coupled to communication unit 110, further described below, by a communication channel 102B, which may also be a system bus or other suitable connection. Although shown separately as an example in FIG. 3, computing device 100 may be operatively coupled to presence-sensitive display 101 and communication unit 110 by any number of one or more communication channels.

In other examples, such as illustrated previously in FIGS. 1-2, computing device 100 may be a portable or mobile device such as mobile phones (including smart phones), laptop computers, etc. In some examples, computing device 100 may be a desktop computers, tablet computers, smart television platforms, cameras, personal digital assistants (PDAs), servers, mainframes, etc.

Presence-sensitive display 101, as shown in FIG. 3, may include display device 103 and presence-sensitive input device 105. Display device 103 may, for example, receive data from computing device 100 and display the graphical content. In some examples, presence-sensitive input device 105 may determine one or more user inputs (e.g., continuous gestures, multi-touch gestures, single-touch gestures, etc.) at presence-sensitive display 101 using capacitive, inductive, and/or optical recognition techniques and send indications of such user input to computing device 100 using communication channel 102A. In some examples, presence-sensitive input device 105 may be physically positioned on top of display device 103 such that, when a user positions an input unit over a graphical element displayed by display device 103, the location at which presence-sensitive input device 105 corresponds to the location of display device 103 at which the graphical element is displayed.

As shown in FIG. 3, computing device 100 may also include and/or be operatively coupled with communication unit 110. Communication unit 110 may include functionality of communication unit 44 as described in FIG. 2. Examples of communication unit 110 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 100 may also include and/or be operatively coupled with one or more other devices, e.g., input devices, output devices, memory, storage devices, etc. that are not shown in FIG. 3 for purposes of brevity and illustration.

FIG. 3 also illustrates a projector 120 and projector screen 122. Other such examples of projection devices may include electronic whiteboards, holographic display devices, and any other suitable devices for displaying graphical content. Projector 120 and project screen 122 may include one or more communication units that enable the respective devices to communicate with computing device 100. In some examples, the one or more communication units may enable communication between projector 120 and projector screen 122. Projector 120 may receive data from computing device 100 that includes graphical content. Projector 120, in response to receiving the data, may project the graphical content onto projector screen 122. In some examples, projector 120 may determine one or more user inputs (e.g., continuous gestures, multi-touch gestures, single-touch gestures, etc.) at projector screen using optical recognition or other suitable techniques and send indications of such user input using one or more communication units to computing device 100.

Projector screen 122, in some examples, may include a presence-sensitive display 124. Presence-sensitive display 124 may include a subset of functionality or all of the functionality of UI device 4 as described in this disclosure. In some examples, presence-sensitive display 124 may include additional functionality. Projector screen 122 (e.g., an electronic whiteboard), may receive data from computing device 100 and display the graphical content. In some examples, presence-sensitive display 124 may determine one or more user inputs (e.g., continuous gestures, multi-touch gestures, single-touch gestures, etc.) at projector screen 122 using capacitive, inductive, and/or optical recognition techniques and send indications of such user input using one or more communication units to computing device 100.

FIG. 3 also illustrates tablet device 126 and visual display device 130. Tablet device 126 and visual display device 130 may each include computing and connectivity capabilities. Examples of tablet device 126 may include e-reader devices, convertible notebook devices, hybrid slate devices, etc. Examples of visual display device 130 may include televisions, computer monitors, etc. As shown in FIG. 3, tablet device 126 may include a presence-sensitive display 128. Visual display device 130 may include a presence-sensitive display 132. Presence-sensitive displays 128, 132 may include a subset of functionality or all of the functionality of UI device 4 as described in this disclosure. In some examples, presence-sensitive displays 128, 132 may include additional functionality. In any case, presence-sensitive display 132, for example, may receive data from computing device 100 and display the graphical content. In some examples, presence-sensitive display 132 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 100.

As described above, in some examples, computing device 100 may output graphical content for display at presence-sensitive display 101 that is coupled to computing device 100 by a system bus or other suitable communication channel. Computing device 100 may also output graphical content for display at one or more remote devices, such as projector 120, projector screen 122, tablet device 126, and visual display device 130. For instance, computing device 100 may execute one or more instructions to generate and/or modify graphical content in accordance with techniques of the present disclosure. Computing device 100 may output the data that includes the graphical content to a communication unit of computing device 100, such as communication unit 110. Communication unit 110 may send the data to one or more of the remote devices, such as projector 120, projector screen 122, tablet device 126, and/or visual display device 130. In this way, computing device 100 may output the graphical content for display at one or more of the remote devices. In some examples, one or more of the remote devices may output the graphical content at a presence-sensitive display that is included in and/or operatively coupled to the respective remote devices.

In some examples, computing device 100 may not output graphical content at presence-sensitive display 101 that is operatively coupled to computing device 100. In other examples, computing device 100 may output graphical content for display at both a presence-sensitive display 101 that is coupled to computing device 100 by communication channel 102A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 100 and output for display at presence-sensitive display 101 may be different than graphical content display output for display at one or more remote devices.

Computing device 100 may send and receive data using any suitable communication techniques. For example, computing device 100 may be operatively coupled to external network 114 using network link 112A. Each of the remote devices illustrated in FIG. 3 may be operatively coupled to network external network 114 by one of respective network links 112B, 112C, and 112D. External network 114 may include network hubs, network switches, network routers, etc., that are operatively inter-coupled thereby providing for the exchange of information between computing device 100 and the remote devices illustrated in FIG. 3. In some examples, network links 112A-112D may be Ethernet, ATM or other network connections. Such connections may be wireless and/or wired connections.

In some examples, computing device 100 may be operatively coupled to one or more of the remote devices included in FIG. 3 using direct device communication 118. Direct device communication 118 may include communications through which computing device 100 sends and receives data directly with a remote device, using wired or wireless communication. That is, in some examples of direct device communication 118, data sent by computing device 100 may not be forwarded by one or more additional devices before being received at the remote device, and vice-versa. Examples of direct device communication 118 may include Bluetooth, Near-Field Communication, Universal Serial Bus, WiFi, infrared, etc. One or more of the remote devices illustrated in FIG. 3 may be operatively coupled with computing device 100 by communication links 116A-116D. In some examples, communication links 112A-112D may be connections using Bluetooth, Near-Field Communication, Universal Serial Bus, infrared, etc. Such connections may be wireless and/or wired connections.

In accordance with techniques of the disclosure, computing device 100 may be operatively coupled to visual display device 130 using external network 114. In response to determining a geographic location of computing device 100, computing device 100 or a networked device may determine one or more search types associated with the geographic location. Computing device 100 may then output the determined search type(s) for display at presence-sensitive display 132 or any other display of FIG. 3. In addition, in response to receiving search results for the selected search type, computing device 100 may output the search results for display at presence-sensitive display 132 or any other display of FIG. 3. In this manner, any of the graphical user interfaces or objects output by computing device 100 may be displayed by any type of display described herein.

Figure 4:
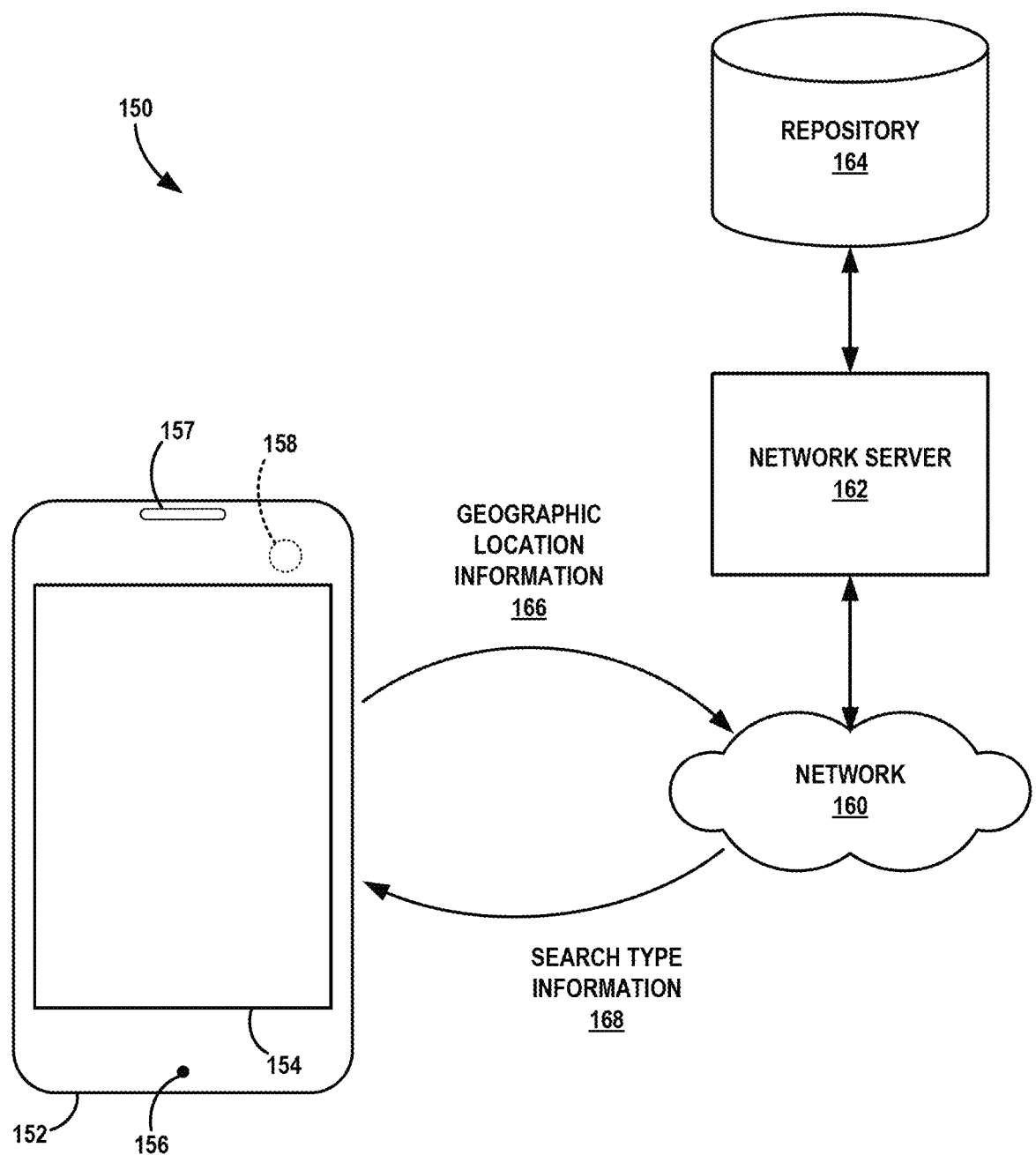
FIG. 4 is a conceptual diagram illustrating an example system including a computing device and networked server configured to predictively present selective search capabilities via the computing device.

FIG. 4 is a conceptual diagram illustrating an example system 150 including computing device 152 and networked server 162 configured to predictively present selective search capabilities to a user via computing device 152. Although computing device 152 may determine one or more search types associated with the geographical location of computing device 152 (as described herein with respect to computing device 2 of FIGS. 1 and 2), networked server 162 (e.g., a networked device) may determine search types associated with the geographic location of computing device 152 or assist computing device 152 in at least a portion of the determination. Computing device 152 may present the determined search types to the user via display device 154, for example, once networked server 162 performs the search type determination.

As shown in FIG. 4, system 150 includes computing device 152, network 160, networked server 162, and repository 164. Computing device 152, in some examples, is or is a part of a portable computing device (e.g., a mobile phone, a smartphone, a netbook, a notebook, a tablet device, or a smart watch). In other examples, computing device 152 may be at least a part of a digital camera, a music player, or any other device that a user may carry or move between different locations. In some examples, computing device 152 may be similar to computing device 2 of FIGS. 1 and 2. Computing device 152 may also connect to network 160 (e.g., a wired or wireless network). Although network 160 may be a single network, network 160 may be representative of two or more networks that allow computing device 152 to communicate with networked server 162.

Computing device 152 may include display device 154, rear camera 158, microphone 156, and speaker 157. Display device 154 may include one or more input devices and/or output devices so that the user can communicate with computing device 12. In one example, display device 154 may include a touch screen interface (e.g., a presence-sensitive display that includes a presence-sensitive input device). In other examples, display device 154 may include a display and one or more buttons, pads, joysticks, mice, tactile device, or any other device capable of turning user actions into electrical signals that control computing device 152. In any example, the user may interact with display device 154 or any other input devices to provide input prior to or during the processes described herein.

Rear camera 158 may enable computing device 152 to capture images (e.g., still images and/or video) of the environment surrounding computing device 152 such as people, landscapes, and objects. Rear camera 158 may include one or more optical sensors capable of generating high-resolution images. For example, the optical sensor may include more than one million pixels (a one megapixel sensor), more than five million pixels (a five megapixel sensor), or even more than ten million pixels (a ten megapixel sensor). In some examples, computing device 152 may include two or more cameras disposed on any surface of computing device 152 or coupled to computing device 152 using a cable. Alternatively, rear camera 158 may be placed on the front or other surface of computing device 152.

Microphone 154 may be configured to capture sound around computing device 152, such as user speech, speech from other people, and environmental sounds. Speaker 157 may be configured to generate and deliver audio to the user such as contact speech or other sounds. In some examples, computing device 152 may include more than one microphone 156 and speaker 157. Although microphone 156 and speaker 157 may be located on or within a housing of computing device 152, microphone 156 and/or speaker 157 may be electrically coupled to computing device 152 via one or more cables. Microphone 156 is an example of an audio input and speaker 157 is an example of an audio output. In other examples, computing device 152 may include additional, or alternative, audio inputs and audio outputs that include a sensor or direct electrical connection configured to accept audio from an attached device or deliver audio to an attached device.

Computing device 152 and networked server 162 may cooperatively function to provide predictive search types to a user based on the geographical location of computing device 152. Computing device 152 may determine the geographical location at which the computing device is located. Computing device 152 may include a device location module, for example, that obtains data from GPS satellites, cellular network access points, or local area network access points, or any other device from which data regarding the position of computing device 152 can be obtained. Using this data, computing device 152 may determine the current geographic location of computing device 152. Computing device 152 may also update the geographic location as appropriate. In some examples, computing device 152 may transmit data relating to the location of computing device 152 to networked server 162, networked server 162 may determine the geographic location of computing device 152, and networked server 162 may transmit the determined geographic location back to computing device 152.

Computing device 152 may transmit geographic location information 166 to networked server 162 via network 160 in order to obtain one or more search types associated with the determined geographic location. Geographic location information 166 may include the determined geographic location or an indication of the geographic location. In response to receiving geographic location information 166, networked server 162 may determine one or more search types associated with the geographic location of computing device 152. For example, networked server 162 may search one or more repositories, such as repository 164, for one or more databases that associate search types with respective geographic locations. Networked server 162 may compare the geographic location of computing device 152 to one or more sets of locations stored in repository 164, and select the search types that are associated with a location that compares to the geographic location of computing device 152. For example, networked server 162 may select search types from the set of locations for each location within a threshold geographic distance from the geographic location of computing device 152. Networked server 162 may include a predictive module, similar to the predictive module of computing device 2 in FIG. 1, to determine the search types.

Once networked server 162 has determined the appropriate one or more search types for the received geographic location of computing device 152, networked server 162 may transmit search type information 168 to computing device 152 via network 160. Search type information 168 may include the determined search types or indications of the search types. In some examples, search type information 168 may include an indication of the geographic location for which the search types were selected. If networked server 162 determines that no search types were associated with the geographic location of computing device 152, search type information 168 may include a message indicating that the geographic location was not associated with any particular search types.

Computing device 152 may present the search types received from networked server 162. Responsive to receiving a user input selecting an indication of one of the determined search types, computing device 152 may obtain one or more search terms for the search type (e.g., an image for a visual search type). Computing device 152 may transmit the search terms as a search request to networked server 162 via network 160 in order to obtain one or more search results relevant to the search terms. Networked server 162 may search one or more repositories (e.g., repository 164), computing devices, or any other resources to determine the search results. Networked server 162 may then respond to the search request by transmitting the search results to computing device 152 via network 160 for display at display device, for example. In some examples, computing device 152 may additionally, or alternatively, generate search results in response to the search request. In this manner, the search results may include results obtained from computing device 152 and/or repositories or other devices accessible via network 160.

Transmission of geographic location information 166, or any other data from computing device 152, may require a connection between computing device 152 and networked server 162 using network 160. Both computing device 152 and networked server 162 may connect to network 160. Network 160 may be embodied as one or more of the Internet, a wireless network, a wired network, a cellular network, or a fiber optic network. In other words, network 160 may be any data communication protocol or protocols that facilitate data transfer between two or more devices. Networked server 162 may also connect to repository 164 for storing sets of locations and associated search types, searchable information, or any other data related to the functions described herein. Networked server 162 and repository 164 may each include one or more servers or databases, respectively. In this manner, networked server 162 and repository 164 may be embodied as any hardware necessary to determine one or more search types based on a geographic location at which computing device 152 is located. Networked server 162 may include one or more servers, desktop computers, mainframes, minicomputers, or other computing devices capable of executing computer instructions and storing data. In some examples, functions attributable to networked server 162 herein may be attributed to respective different servers for respective functions. Repository 164 may include one or more memories, repositories, hard disks, or any other data storage device. In some examples, repository 164 may be included within networked server 162.

Repository 164 may be included in, or described as, cloud storage. In other words, a set of locations associated with respective search types may be stored in one or more locations in the cloud (e.g., one or more repositories 164). Networked server 162 may access the cloud and retrieve the appropriate search types corresponding to the geographic location of computing device 152. In some examples, repository 164 may include Relational Database Management System (RDBMS) software. In one example, repository 164 may be a relational database and accessed using a Structured Query Language (SQL) interface that is well known in the art. Repository 164 may alternatively be stored on a separate networked computing device and accessed by networked server 162 through a network interface or system bus. Repository 164 may in other examples be an Object Database Management System (ODBMS), Online Analytical Processing (OLAP) database or other suitable data management system.

Figure 5:
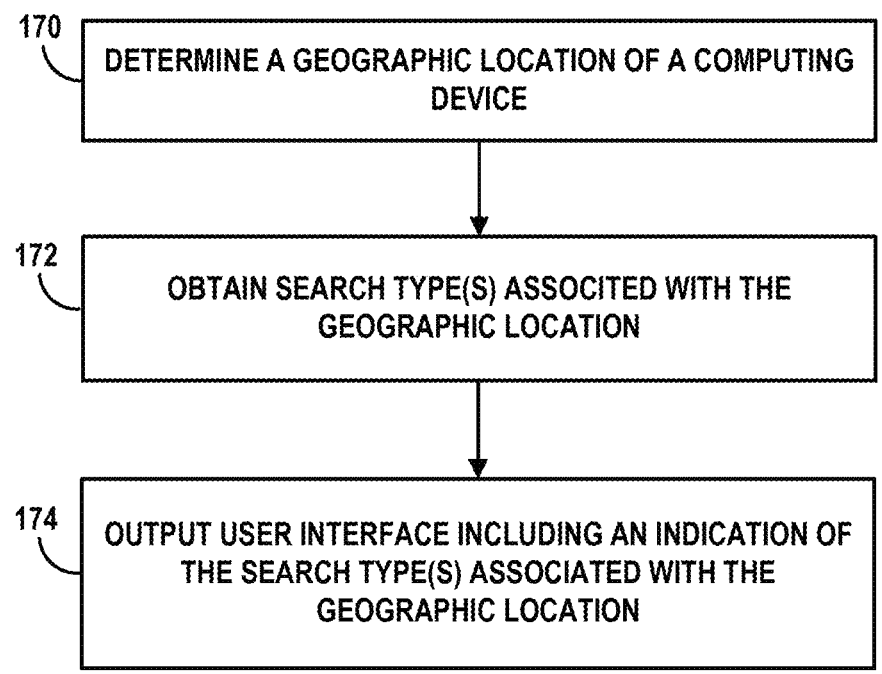
FIG. 5 is a flow diagram illustrating an example operation of a computing device.

FIG. 5 is a flow diagram illustrating an example operation of an example computing device, in accordance with one or more aspects of the present disclosure. A computing device, such as computing device 2 illustrated in FIGS. 1 and 2 and computing device 100 illustrated in FIG. 3, may perform the process of FIG. 5. In some instances, one or more processors of a computing device, such as processors 40 of computing device 2 of FIGS. 1 and 2, may also perform the process of FIG. 5. For purposes of illustration, FIG. 5 is described below within the context of computing device 2 of FIGS. 1 and 2.

Computing device 2, and more specifically, device location module 10, is configured to determine a geographic location at which computing device 2 is located (170). This geographic location may be referred to as associated with computing device 2 or a geographic location of computing device 2. Device location module 10 may determine the geographic location based on a GPS signal, cellular radio signals (e.g., for cellular tower triangulation), Wi-Fi signals, or other signals or techniques known in the art. Predictive module 12 may then obtain one or more search types associated with the geographic location of computing device 2 (172). Obtaining the search types may include determining the search types or receiving the search types from a networked device that determined the search types.

In one example, predictive module 12 of computing device 2 may compare the geographic location of computing device 2 to a set (e.g., a whitelist) of locations to determine if computing device 2 is proximate to one of the whitelisted locations of the set. Each of the whitelisted locations may be associated with one or more search types applicable or appropriate for that particular location. As one example, predictive module 12 may determine that the geographic location compares to a location associated with a bookstore. Bookstores frequently include goods having bar codes. Thus, predictive module 12 may be configured to determine that bar code scanner functionality of a visual search is related to the geographic location of computing device 2. Responsive to determining that computing device 2 is proximate to a whitelisted location, predictive module 12 may be configured to determine that one or more search type is associated with the geographic location. In other examples, computing device 2 may obtain the search types by transmitting the geographic location of computing device 2 to a networked server via a network and receiving the one or more search types determined by the networked server.

Responsive to obtaining the one or more search types associated with the geographic location of computing device 2, predictive module 12 may generate predictive user interface elements that may include information including an indication of the one or more search types associated with the geographic location (174). In one example of a visual search type, the predictive user interface may include an indication about the geographic location and/or an indication of the visual search capabilities determined to be particularly relevant to the geographic location. Predictive module 12 may provide at least an indication of the generated predictive user interface elements to UI module 6, which causes UID 4 to output predictive GUI 14, which includes visual search indication 18 within predictive card 16. However, the search types may be outputted for presentation in various different formats. In some examples, UID 4 outputs predictive user interface 14 in response to user input.

As described herein, the determined search types may include a variety of different search types. For example, search types may include a visual search type, an audio search, type, a textual search type, or any other search type related to the type of input receivable by computing device 2. In addition, each search type may include a subtype or capability specific to a search that may be performed for more information. For example, a visual search type may correspond to one or more of a barcode scanning capability, a quick response code scanning capability, an image recognizer capability, and an optical character recognition capability.

Figure 6:
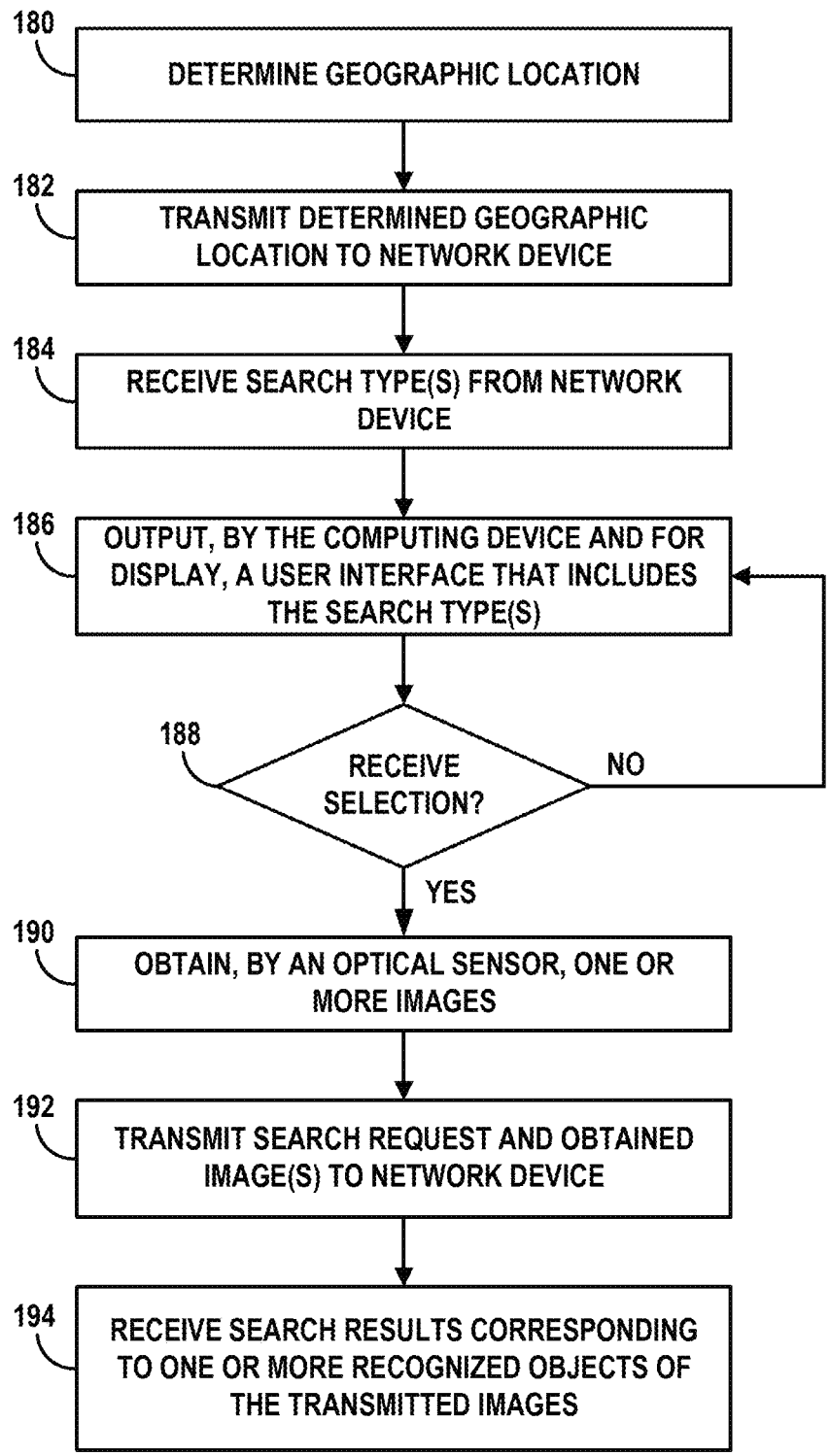
FIG. 6 is a flow diagram illustrating another example operation of a computing device.

FIG. 6 is a flow diagram illustrating another example operation of a computing device. A computing device, such as computing device 2 illustrated in FIGS. 1 and 2 and computing device 100 illustrated in FIG. 3, may perform the process of FIG. 6. In some instances one or more processors of a computing device, such as processors 40 of computing device 2 illustrated in FIGS. 1 and 2, may also perform the process of FIG. 6. For purposes of illustration, FIG. 6 is described below within the context of computing device 2 of FIGS. 1 and 2. Although the example of FIG. 6 is directed to performing a search of a visual search type, searches for any search type may be performed in a similar manner.

Computing device 2, and more specifically, device location module 10, is configured to determine a geographic location at which computing device 2 is located (180). Device location module 10 may determine the geographic location based on a GPS signal, cellular radio signals (e.g., for cellular tower triangulation), Wi-Fi signals, or other signals or techniques known in the art. Predictive module 12 may then transmit, via communication unit 44, the determined geographic location to a networked device (e.g., a networked server) via a network (182). The networked device may then determine one or more search types associated with the transmitted geographic location.

Communication unit 44 may then receive the one or more determined search types from the networked device via the network (184). Communication unit 44 may transfer the search types, or indications of the search types, to predictive module 12. Predictive module 12 may then output, for display, a predictive GUI that includes indications of the one or more search types (186). The GUI may include a predictive card, as illustrated in the example of FIG. 1. As long as computing device 2 does not receive user input selecting any of the displayed search types ("NO" branch of block 188), predictive module 12 may continue to output the predictive GUI including the indications of the search types (186).

In response to receiving a user input selecting one of the displayed search types, such as a visual search type ("YES" branch of block 188), computing device 2 may obtain one or more images with an optical sensor such as a camera (190). In response to obtaining the one or more images, search module 8 may be configured to transmit a search request and the one or more obtained images to the networked device via the network (192). The transmitted images may be used as the search terms for the search request. In some examples, search module 8, or another component of computing device 2, may transmit the images to a different networked device than the networked device that determined the search types associated with the geographic location of computing device 2. Subsequent to the networked device obtaining search results in response to the search request, computing device 2 may receive the search results corresponding to one or more recognized objects of the transmitted images (194). If the visual search type was limited to a more specific visual search capability, such as a bar code capability, the search results may be limited to bar code results corresponding to any recognized bar code objects in the images, for example.

Computing device 2 may repeat the technique, or portions of the technique, described in FIG. 6 for additional search types or for updated geographic locations of computing device 2. In other words, device location module 10 and/or predictive module 12 may initiate subsequent search type determinations in response to identifying a change to the geographic location of computing device 2. Alternatively, search types may be continually determined based on the most recent geographic location of computing device 2, and predictive module 12 may update the output of search types in response to identifying that the search types have changed.

Figure 7:
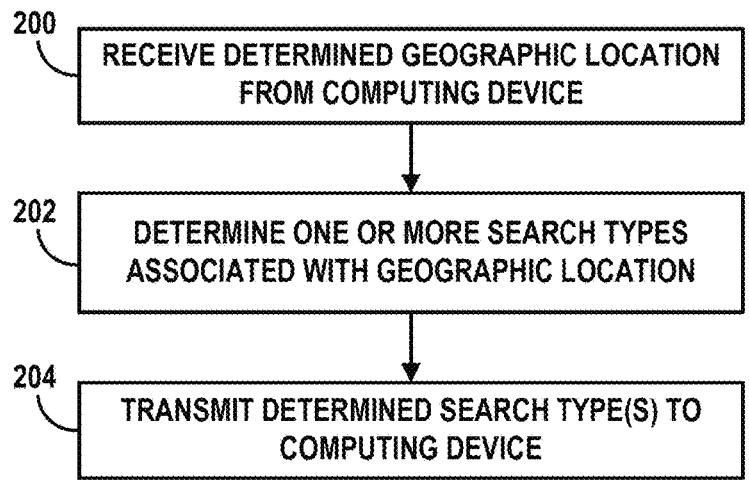
FIGS. 7 and 8 are flow diagrams illustrating example operations of a networked server in communication with a computing device.
Figure 8:
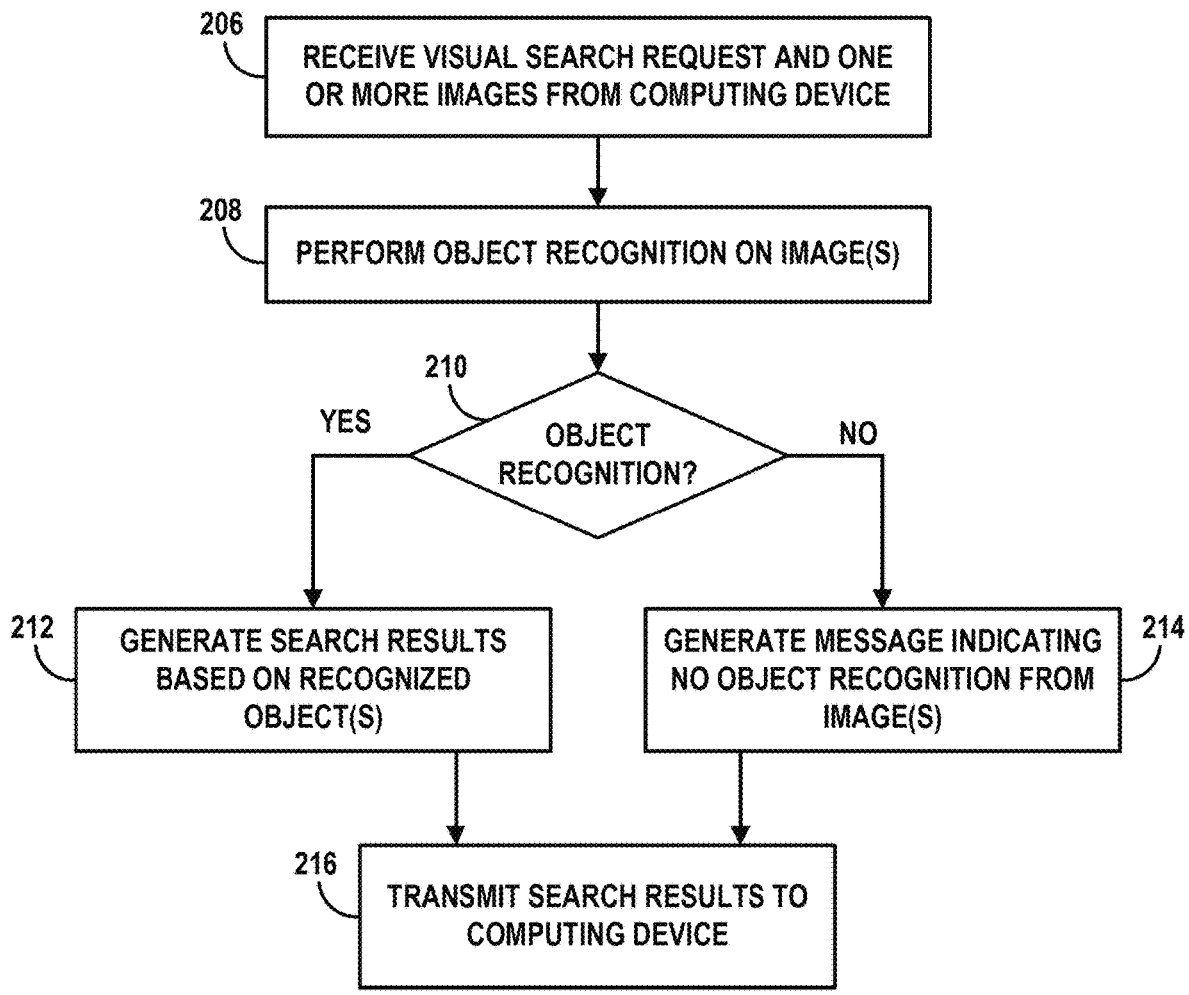

FIGS. 7 and 8 are flow diagrams illustrating example operations of a networked server (a networked device) in communication with the computing device. The operations of FIGS. 7 and 8 may correspond to information transmitted from a computing device, such as computing device 2 of FIG. 6. The process of FIGS. 7 and 8 may be performed by one or more networked servers, such as networked server 162 illustrated in FIG. 4. For purposes of illustration, FIGS. 7 and 8 are described below within the context of networked server 162 and system 150 of FIG. 4. Computing device 152 will also be described, but computing device 2 or any other computing device described herein may similarly communicate with networked server 162.

As shown in FIG. 7, networked server 162 may receive a determined geographical location (e.g., geographic location information) from computing device 152 (200). The geographic location may be indicative of the location at which computing device 152 was located when the geographic location was determined. In response to receiving the geographic location, networked server 162 determines one or more search types associated with the received geographic location of computing device 152 (202). For example, networked server 162 may compare the geographic location to a set of locations (e.g., whitelisted locations) stored by repository 164. Networked server may select the one or more search types associated with the corresponding location of the set of locations.

In response to determining the one or more search types associated with the geographic location, networked server 162 may transmit the determined search types (e.g., search type information) to computing device 152 via network 160 (204). If networked server 162 cannot determine any search types associated with the geographic location, networked server 162 may transmit an indication of a null set of search types to computing device 152. Networked server 162 may repeat the technique of FIG. 7 for any received geographic location.

FIG. 8 may be specific to generating search results for a visual search type. As shown in FIG. 8, networked server 162 may be configured to receive a visual search request and one or more images from computing device 152 (206). Networked server 162 may then perform object recognition on the one or more received images to identify one or more objects (208). The recognized objects may be objects for which search results may be generated. In some examples, networked server 162 may analyze the one or more images for any objects that correspond to a set of recognized objects stored in repository 164. Networked server 162 may utilize any one or more object recognition algorithms to perform the object recognition process.

In response to recognizing an object within one of the images ("YES" branch of block 210), networked server 162 may generate search results based on the recognized object (212). In this manner, the recognized object may be used as one or more search terms. In response to generating the search results, networked server 162 transmits the search results to computing device 162 via network 160. In response to determining that no object is recognized within one of the images ("NO" branch of block 210), networked server 162 may generate a message indicating that no objects were recognized from the received images (214). In response to generating the message, networked server 162 transmits the message as a search result to computing device 162 via network 160. Networked server 162 may repeat the techniques of FIG. 8 for each visual search request received from computing device 152.

In one or more examples, the functions described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium.

For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media or computer-readable storage devices. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable storage media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:
1. A computer-implemented method comprising:
   before a user has initiated an image-based search at a computing device:
      obtaining data indicating a current context including at least a geographic location associated with the computing device,
      determining that the computing device is physically located proximate to a predefined, geographic location based on the data indicating a current context,
      in response to determining that the computing device is physically located proximate to the predefined, geographic location:
         accessing a repository that associates, for each predefined geographic location of a plurality of predefined geographic locations, a respective image-based search type for the predefined geographic location, and wherein the respective image-based search types define multiple candidate image-based search types that each respectively invoke a search type capability of an image search system that is different from a search type capability invoked by each other candidate image-based search type;

determining, based on the repository and the geographic location, a particular image-based search type from the multiple candidate image-based search types, wherein the particular image-based search type is associated with the predefined, geographic location in the repository, and providing a user interface including a control for initiating an image-based search of the particular image-based search type, wherein the user interface comprises a predictive card, wherein the predictive card comprises information generated by a predictive model.

2. The computer-implemented method of claim 1, wherein the respective image-based search types comprise at least one of barcode scanning search, a quick response code scanning search, an image recognition search, or an optical character recognition search.

3. The computer-implemented method of claim 1, wherein the computing device comprises at least one of a mobile phone, a smartphone, a tablet computer, a smartwatch, or a notebook computer.

4. The computer-implemented method of claim 1, wherein the data indicating the current context is generated with one or more sensors.

5. The computer-implemented method of claim 1, wherein obtaining data indicating the current context comprises receiving data indicating the current context from the computing device via a network.

6. The computer-implemented method of claim 1, wherein the user interface is provided via at least one of a resistive touchscreen, a surface acoustic wave touchscreen, a capacitive touchscreen, a projective capacitance touchscreen, a pressure sensitive screen, or an acoustic pulse recognition touchscreen.

7. A computing system, the computing system comprising:

one or more processors; and one or more non-transitory computer-readable media that collectively store instructions that, when executed by the one or more processors, cause the computing system to perform operations, the operations comprising:

storing a plurality of whitelisted locations, and associating one or more search types with each whitelisted location, wherein the one or more search types comprise a visual search type corresponding to at least one of a barcode scanning capability, a quick response code scanning capability, an image recognizer capability, and an optical character recognition capability, wherein a first whitelisted location is associated with a first search type associated with a first specific search capability, wherein a second whitelisted location is associated with a second search type associated with a second specific search capability, and wherein the first specific search capability differs from the second search capability;

before a user has initiated an image-based search at a computing device:

obtaining a geographic location of the computing device;

determining that the geographic location of the computing device is associated with a particular whitelisted location of the plurality of whitelisted locations;

obtaining the one or more search types associated with the particular whitelisted location;

responsive to obtaining the one or more search types, providing a graphical user interface comprising at least an indication of the one or more search types associated with the particular whitelisted location, wherein the graphical user interface comprises a predictive card, wherein the predictive card comprises information generated by a predictive model.

8. The computing system of claim 7, wherein obtaining the one or more search types associated with the particular whitelisted location comprises determining the one or more search types associated with the particular whitelisted location.

9. The computing system of claim 8, wherein determining the one or more search types associated with the particular whitelisted location comprises:

comparing the geographic location to the plurality of whitelisted locations; and determining, based at least in part on the geographic location and the plurality of whitelisted locations, the one or more search types associated with the particular whitelisted location.

10. The computing system of claim 8, wherein determining the one or more search types associated with the particular whitelisted location comprises:

determining that the geographic location of the computing device is within a threshold distance from a whitelisted location associated with the one or more search types.

11. The computing system of claim 8, wherein determining the one or more search types comprises determining, based on the geographic location and a type of the computing device, the one or more search types.

12. The computing system of claim 8, wherein determining the one or more search types comprises determining, based on the geographic location, a current time during which the geographic location was determined, and a scheduled event associated with the computing device, the one or more search types.

13. The computing system of claim 7, wherein obtaining the one or more search types associated with the geographic location comprises:

transmitting, by the computing device and via a network, the geographic location to a networked device; and receiving, from the networked device, the one or more search types associated with the geographic location.

14. The computing system of claim 7, wherein obtaining a search input for one of the one or more search types indicated on the graphical user interface, comprises:

receiving user input selecting one of the one or more search types associated with the geographic location, wherein the selected search type comprises a visual search type; and obtaining, by at least one optical sensor, one or more images, and wherein obtaining and outputting for display one or more search results associated with the search input comprises:

transmitting, via a network, the one or more images to a networked device;

receiving, from the networked device and based on at least one of the one or more images, at least one search result, and outputting for display, the graphical user interface comprising an indication of the at least one search result.

15. The computing system of claim 7, wherein the computing device comprises at least one of a smartphone, a tablet computer, and a smartwatch.

16. The computing system of claim 7, wherein the predictive card comprises information associated with the particular whitelisted location.

17. The computing system of claim 16, wherein the predictive card comprises at least one of an icon or a picture associated with the particular whitelisted location.

18. The computing system of claim 7, wherein the operations further comprise:
    receiving a selection of a particular search type from the computing device;
    obtaining a search input from the computing device; and
    providing for display one or more search results based at least in part on the particular search type and the search input.

19. One or more non-transitory computer-readable media that collectively store instructions that, when executed by one or more computing devices, cause the one or more computing devices to perform operations, the operations comprising:
    before a user has initiated an image-based search at a computing device:
        obtaining data indicating a current context including at least a geographic location associated with the computing device,
        determining that the computing device is physically located proximate to a predefined, geographic location based on the data indicating a current context,
    in response to determining that the computing device is physically located proximate to the predefined, geographic location:
        accessing a repository that associates, for each predefined geographic location of a plurality of predefined geographic locations, a respective image-based search type for the predefined geographic location, and wherein the respective image-based search types define multiple candidate image-based search types that each respectively invoke a search type capability of an image search system that is different from a search type capability invoked by each other candidate image-based search type;
        determining, based on the repository and the geographic location, a particular image-based search type from the multiple candidate image-based search types, wherein the particular image-based search type is associated with the predefined, geographic location in the repository, and
    providing a user interface including a control for initiating an image-based search of the particular image-based search type, wherein the user interface comprises a predictive card, wherein the predictive card comprises information generated by a predictive model.

\* \* \* \* \*